United States Patent
Hu et al.

(10) Patent No.: US 7,039,773 B2
(45) Date of Patent: May 2, 2006

(54) METHOD AND MECHANISM FOR EFFICIENT IMPLEMENTATION OF ORDERED RECORDS

(75) Inventors: Wei Ming Hu, Palo Alto, CA (US); Juan R. Loaiza, Redwood City, CA (US); Roger J. Bamford, Woodside, CA (US); Vikram Joshi, Los Gatos, CA (US); Arvind Nithrakashyap, San Mateo, CA (US); Tudor Bosman, San Francisco, CA (US); Vinay Srihari, South San Francisco, CA (US); Alok Pareek, Brisbane, CA (US)

(73) Assignee: Oracle International Corporation, Redwood Shores, CA (US)

( * ) Notice: Subject to any disclaimer, the term of this patent is extended or adjusted under 35 U.S.C. 154(b) by 336 days.

(21) Appl. No.: 10/426,471

(22) Filed: Apr. 29, 2003

(65) Prior Publication Data
US 2004/0221116 A1 Nov. 4, 2004

(51) Int. Cl.
*G06F 12/00* (2006.01)

(52) U.S. Cl. ............ 711/158; 711/161; 707/202; 707/203; 714/16; 714/20

(58) Field of Classification Search ............ 711/158, 711/161–162; 707/200–204; 714/15–16, 714/18–20
See application file for complete search history.

(56) References Cited

U.S. PATENT DOCUMENTS

| 5,452,430 | A | * | 9/1995 | Dievendorff et al. ......... 714/37 |
| 5,452,445 | A | | 9/1995 | Hallmark et al. |
| 5,485,608 | A | | 1/1996 | Lomet et al. |
| 5,499,367 | A | | 3/1996 | Bamford et al. |
| 5,524,205 | A | | 6/1996 | Lomet et al. |
| 5,737,601 | A | | 4/1998 | Jain et al. |
| 5,796,934 | A | | 8/1998 | Bhanot et al. |
| 5,806,075 | A | | 9/1998 | Jain et al. |
| 5,828,821 | A | * | 10/1998 | Hoshina et al. .............. 714/15 |
| 5,832,516 | A | | 11/1998 | Bamford et al. |
| 5,832,521 | A | | 11/1998 | Klots et al. |
| 5,848,405 | A | | 12/1998 | Norcott |

(Continued)

OTHER PUBLICATIONS

Oracle8 Server Concepts, Release 8.0, Jun. 1997, pp. 27-1 to 27-24.

*Primary Examiner*—Nasser Moazzami
(74) *Attorney, Agent, or Firm*—Bingham McCutchen LLP

(57) ABSTRACT

An improved method, mechanism, and system for implementing, generating, and maintaining records, such as redo records and redo logs in a database system, are disclosed. Multiple sets of records may be created and combined into a partially ordered (or non-ordered) group of records, which are later collectively ordered or sorted as needed to create an fully ordered set of records. With respect to a database system, redo generation bottleneck is minimized by providing multiple in-memory redo buffers that are available to hold redo records generated by multiple threads of execution. When the in-memory redo buffers are written to a persistent storage medium, no specific ordering needs to be specified with respect to the redo records from the different in-memory redo buffers. While the collective group of records may not be ordered, the written-out redo records may be partially ordered based upon the ordered redo records from within individual in-memory redo buffers. At recovery, ordering and/or merging of redo records may occur to satisfy database consistency requirements.

60 Claims, 6 Drawing Sheets

U.S. PATENT DOCUMENTS

| | | |
|---|---|---|
| 5,850,507 A | 12/1998 | Ngai et al. |
| 5,852,818 A | 12/1998 | Guay et al. |
| 5,870,743 A | 2/1999 | Cohen et al. |
| 5,899,988 A | 5/1999 | Depledge et al. |
| 5,903,898 A | 5/1999 | Cohen et al. |
| 5,933,593 A | 8/1999 | Arun et al. |
| 5,946,700 A | 8/1999 | Pongracz et al. |
| 5,956,704 A | 9/1999 | Gautam et al. |
| 5,996,088 A | 11/1999 | Frank et al. |
| 6,026,406 A | 2/2000 | Huang et al. |
| 6,041,423 A | 3/2000 | Tsukerman |
| 6,055,546 A | 4/2000 | Pongracz et al. |
| 6,078,930 A | 6/2000 | Lee et al. |
| 6,108,654 A | 8/2000 | Chan et al. |
| 6,125,368 A | 9/2000 | Bridge et al. |
| 6,182,241 B1 | 1/2001 | Ngai et al. |
| 6,185,577 B1 | 2/2001 | Nainani et al. |
| 6,243,702 B1 | 6/2001 | Bamford et al. |
| 6,253,212 B1 | 6/2001 | Loaiza et al. |
| 6,295,610 B1 | 9/2001 | Ganesh et al. |
| 6,351,754 B1 | 2/2002 | Bridge, Jr. et al. |
| 6,353,836 B1 | 3/2002 | Bamford et al. |
| 6,397,352 B1 | 5/2002 | Chandrasekaran et al. |
| 6,411,968 B1 | 6/2002 | Bamford et al. |
| 6,487,641 B1 | 11/2002 | Cusson et al. |
| 6,493,726 B1 | 12/2002 | Ganesh et al. |
| 6,507,853 B1 | 1/2003 | Bamford et al. |
| 6,510,421 B1 | 1/2003 | Ganesh et al. |
| 6,542,854 B1 | 4/2003 | Yang et al. |
| 6,732,124 B1 * | 5/2004 | Koseki et al. ............... 707/202 |
| 2004/0148316 A1 * | 7/2004 | Bridge et al. ............ 707/104.1 |

* cited by examiner

METHOD AND MECHANISM FOR EFFICIENT IMPLEMENTATION OF ORDERED RECORDS

BACKGROUND AND SUMMARY

The invention relates to a method and mechanism for implementing and operating upon ordered records or objects. A database system is an example of a type of computing system that creates and operates upon ordered records. In database systems, a "transaction" normally refers to an atomic set of operations performed against a database. The transaction may access, create, modify, or delete database data or database metadata while it is being processed. A "commit" occurs when the transaction has completed its processing and any changes to the database by the transaction are ready to be "permanently" implemented in the database system. Because the transaction is atomic, all actions taken by the transaction must appear to be committed at the same time.

Ordered records, such as transaction log records, can be maintained in a database systems, e.g., to allow suitable recovery operations in the event of a system failure or aborted transaction. Some common problems that could cause a system failure or an aborted transaction include hardware failure, network failure, process failure, database instance failure, data access conflicts, user errors, and statement failures in the database access programs (most often written in the structured query language or SQL).

Different types of transaction log records can be maintained in a database system. A common transaction logging strategy is to maintain "redo" records that log all changes made to the database. Each redo record contains information that can be used to modify a portion of a database, e.g., a database block, from one state to its next changed state. If a failure occurs, then the redo records may be applied in order to restore any changes made to the in-memory copy of the database. "Undo" records can also be maintained for all changes in the database. The undo records contain information that can be used to roll back or reverse a portion of a database from a later state to its next earlier state. In one approach, separate records can be maintained for the redo and undo information.

With "write ahead logging", the redo records logged for a data item must be recorded to disk before the data item can be written to disk. This protects against the situation when a system failure occurs and the version of the database data that is immediately restored from disk does not accurately reflect the most recent state of the database. This may occur because of changes to the data that have only occurred to the in-memory buffer cache, and have not been recorded to disk before the failure. If the on-disk redo log has been properly maintained for these cache-only changes, then recovery can be performed by applying redo records from the on-disk redo log to roll the database forward until it is consistent with the state that existed just before the system failure. An approach for implementing redo records is disclosed in U.S. Pat. No. 6,647,510, issued on Nov. 11, 2003, which is hereby incorporated by reference in its entirety.

In one approach for implementing redo, as each change is made to the database system, a redo record corresponding to the change is written to an in-memory redo buffer. The contents of the in-memory redo buffer are regularly flushed to an on-disk redo log to persistently store the redo records. All redo records for the system are stored in this in-memory redo buffer.

Having a single in-memory redo buffer provides a way of allowing different execution entities that generate redo records in the database (e.g., threads, processes, tasks, etc.) to coordinate the manner in which they allocate space in the on-disk redo log, and thereby coordinate their claims to space in the pre-allocated disk locations for their respective redo records.

However, this approach can suffer from efficiency drawbacks. For example, consider the situation when multiple execution entities are concurrently making changes to the database, and are therefore concurrently generating redo records. This is a common scenario on large multi-threaded/multi-processor systems in which many thousands or tens of thousands of concurrent events may be processed at the same time against a database. A bottleneck may develop as the multiple execution entities contend for space at the head of the in-memory redo buffer to allocate space for their respective redo records. In effect, the requirement to allocate space in the in-memory redo buffer logically causes serialization to occur for the parallel tasks being performed by the multiple execution entities. This serialization can significantly interfere with the performance and scalability of the system.

Accordingly, the present invention provides an improved method, mechanism, and system for implementing, generating, and maintaining ordered (and partially-ordered) records, such as for example, redo records, redo buffers, and redo logs in a database system. In one embodiment, multiple parallel sets of records may be created and combined into a partially ordered (or non-ordered) group of records, which are later collectively ordered or sorted as needed to create an ordered set of records. With respect to database systems, redo generation bottleneck can be minimized by providing multiple in-memory redo buffers that are available to hold redo records generated by multiple threads of execution. When the in-memory redo buffers are written to a persistent storage medium, no specific ordering needs to be specified with respect to the redo records from the different in-memory redo buffers. While the collective group of records may not be ordered, the written-out redo records may be partially ordered based upon the ordered redo records from within individual in-memory redo buffers. At recovery, ordering and/or merging of redo records may occur to satisfy database consistency requirements. These actions solve the redo generation bottle neck problem since, in addition to the multiple in-memory redo buffers, the precise points on the disk-based redo logs does not have to be allocated in advance. Instead, only the range of the on-disk location is identified. Instead of tracking and ordering this information upfront, the burden is moved to the time of recovery for the tasks of specifically identifying and ordering the redo records from on-disk redo log. This approach therefore significantly reduces redo generation bottleneck and makes the redo generation process highly scalable.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using the same reference numbers.

DETAILED DESCRIPTION

Figure 1:
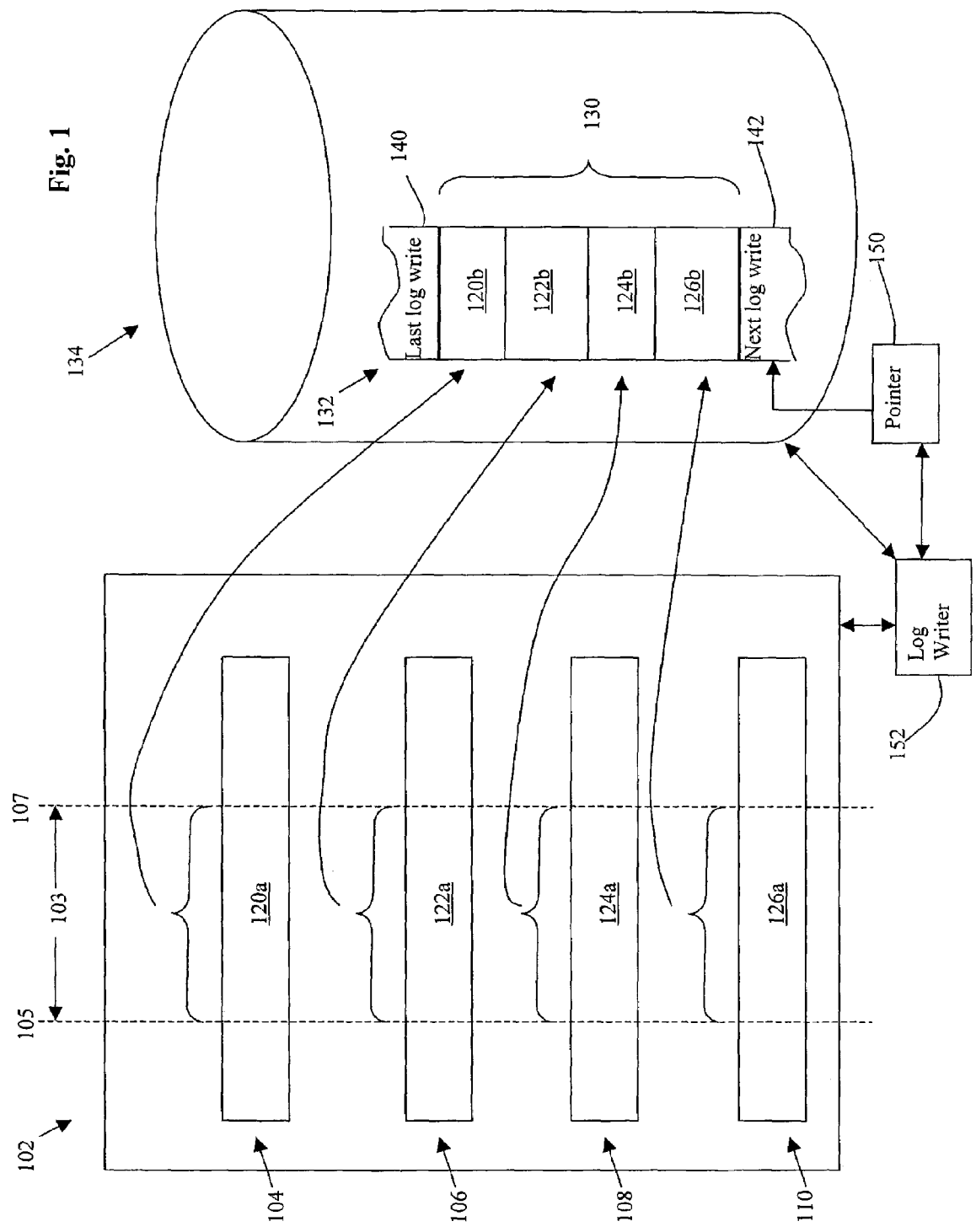
FIG. 1 shows an architecture for implementing redo records according to an embodiment of the invention.

The present invention provides improved methods, mechanisms, and systems for generating, implementing, and using ordered (and partially-ordered) records. In one embodiment, multiple sets of records may be created and combined into a partially ordered (or non-ordered) group of records, which are later collectively ordered or sorted as needed to create an ordered set of records. For the purpose of illustration, the following description is made with reference to log records in a database system. It is noted, however, that the present invention may be applied to implement ordered records and objects in numerous other contexts, and thus should not be limited in its application only to transaction log records in a database system.

In one embodiment, redo generation bottleneck is minimized, in part, by providing multiple in-memory redo buffers that are available to hold redo records generated by multiple threads of execution. This reduces serialization and contention problem with respect to the redo logs by splitting the head of the in-memory redo buffers. This creates multiple parallel in-memory redo buffers that can be accessed by the multiple threads of execution in the database system. To illustrate the invention, the term "threads" will be used to refer to any entity that performs actions in the system, which could further include processes, tasks, etc.

When it is desired to write redo records to a persistent storage medium (which will be illustratively referred to herein as a disk), a cross-sectional range or interval of redo records will be taken from all of the in-memory redo buffers and collectively written to disk. To increase the up-front efficiency when writing to disk, the exact location and/or ordering of the individual redo records may not be specified when it is written to disk. Instead, only the range of the entire group of redo records will be precisely known. In an embodiment, while the collective group of records may not be ordered, the written-out redo records may be partially ordered based upon the ordered redo records from within individual in-memory redo buffers.

If the redo records need to be applied to perform recovery operations, then the redo records for a particular interval should be ordered to ensure that changes to the database system are applied in the proper order. In an embodiment, the work of sorting and/or merging redo records to properly order changes is moved to the back-end, at the time of recovery, rather than the front-end time periods when the redo records are created and/or written to disk. This can increase the scalability and up-front performance of the database system. Moreover, if a system failure does not occur and a recovery is not needed, then this approach does not waste valuable system resources performing ordering operations that will never be needed. Each interval of redo records is a self-contained grouping of records that is database correct and consistent within itself, even if not ordered prior to recovery. Therefore, once properly ordered, each succeeding interval of redo record can be applied in order to properly restore changes to the database during recovery.

FIG. 1 shows an architectural overview of one embodiment of the invention. A database includes memory 102 that comprises multiple in-memory redo buffers, such as in-memory redo buffers 104, 106, 108, and 110. While only four in-memory redo buffers are shown in the example of FIG. 1, it is noted that any number of in-memory redo buffers may be employed in the invention. As multiple threads of execution are performed in the database system, redo records are generated which correspond to work activity performed by the multiple threads of execution. The redo records may be generated/copied and collected at any of the available in-memory redo buffers 104, 106, 108, or 110.

At specified intervals, some or all of the latest redo records in memory are written to an on-disk redo log 132 on disk 134. A log-write interval 103 is established to identify the groups of redo records in memory 102 that will be collectively written to disk 134. The log-write interval 103 is bound by a beginning-point 105 and an end-point 107. Any redo records falling on or between the points specified by the beginning-point 105 and the end-point 107 are collectively written out to on-disk redo log 132 on disk 134 as a single interval 130 of redo records.

In one embodiment, the log-write interval 103 is temporally based, which identifies its associated set of redo records based upon the timestamp of the individual redo records. Therefore, both the beginning-point 105 and the end-point 107 of the log-write interval 103 identify specified time points. The beginning-point 105 of log-write interval 103 is the very next time point beyond the previous interval 140 of redo records that was written to disk 134. The end-point 107 marks the boundary between the present interval 130 of redo records that is to be written to disk 134 and the next interval 142 of redo records.

Each in-memory redo buffer 104, 106, 108, and 110 is separately processed to identify the set of redo records in that in-memory redo buffer that is associated with log-write interval 103. As shown in FIG. 1, in-memory redo buffer 104 includes a set 120a of zero or more redo records that fall within the boundaries of log-write interval 103. Similarly, in-memory redo buffer 106 contains a set 122a of zero or more redo records, in-memory redo buffer 108 contains a set 124a of zero or more redo records, and in-memory redo buffer 110 contains a set 126a of zero or more redo records that fall within the boundaries of log-write interval 103.

In the present embodiment, the identified sets 120a, 122a, 124a, and 126a of redo records are written to disk as a single interval 130 of redo records, but without any specific ordering requirements. Therefore, each set of redo records can be written within interval 130 in any order or placement as may be suitably or efficiently implemented (or with no order or placement requirements, except that they all fall somewhere within interval 130). In the example shown in FIG. 1, each set 120a, 122a, 124a, and 126a of in-memory redo records are written out as discrete and separate sets 120b, 122b, 124b, and 126b of on-disk redo records within interval 130 of on-disk redo log 132. This retains any ordering that may already exist within each set of redo records as generated for the individual in-memory redo buffers, but does not further change the ordering with respect to redo records from other discrete in-memory redo buffers. As described in more detail below, the ordering of the redo records can be resolved at a later point if or when a failure occurs and recovery operations are necessary.

The result is a fully-contained interval 130 of redo records that is correct and consistent with respect to the changes to a database for the time period specified by the log-write interval 103. As continuing changes are made to the database, a chain of these self-contained intervals of redo records are created and stored in the on-disk redo log 132 on disk 134. During recovery, the redo records within each separate and self-contained interval of redo records would be properly ordered. The intervals would be applied in order to restore the state of the database after a failure.

A reference/pointer structure 150 is maintained to identify the correct offset within on-disk redo log 132 to begin writing each interval of redo records. After all redo records associated with log-write interval 103 has been written to interval 130 of on-disk redo log 132, the structure 150 is moved to point to the next available location within on-disk redo log 132 for writing the next interval 142 of redo records.

In one embodiment, a log-writer entity 152 initiates and/or performs the process to write redo records from memory 102 to disk 134. The role of a log-writer 152 can be assumed by any entity in the system, including a dedicated log-writer process or the generator(s) of the redo records. Various criteria may be used by log-writer 152 to determine the timing and scope of a log-write interval 103. For example, regular and periodic timing intervals can be established to write redo records to the on-disk redo log 132. As another example, usage patterns can be tracked to heuristically determine the timing intervals for writing records to disk. As yet another example, the log-writer 152 can dynamically track the contents of the in-memory redo buffers, and initiate the log-write process when threshold limitations are met with respect to the number, size, or extent of time since last flush of the redo records to disk. The boundaries of the log-write interval can also be selected to further specific performance goals of the system. For example, selecting a log-write interval with a smaller time period may increase the number of the intervals of redo records to sort/merge after a system failure when recovery operations are performed, but each interval will have a smaller number of redo records to sort/merge. On the other hand, selecting a log-write interval with a larger time period may decrease the number of the intervals of redo records on-disk to sort/merge after a system failure, but each interval will have a larger number of redo records to sort/merge. As can be seen, the inventive concepts can be practiced with any number of suitable approaches for determining the extent and timing of the log-write intervals 103.

Figure 2:
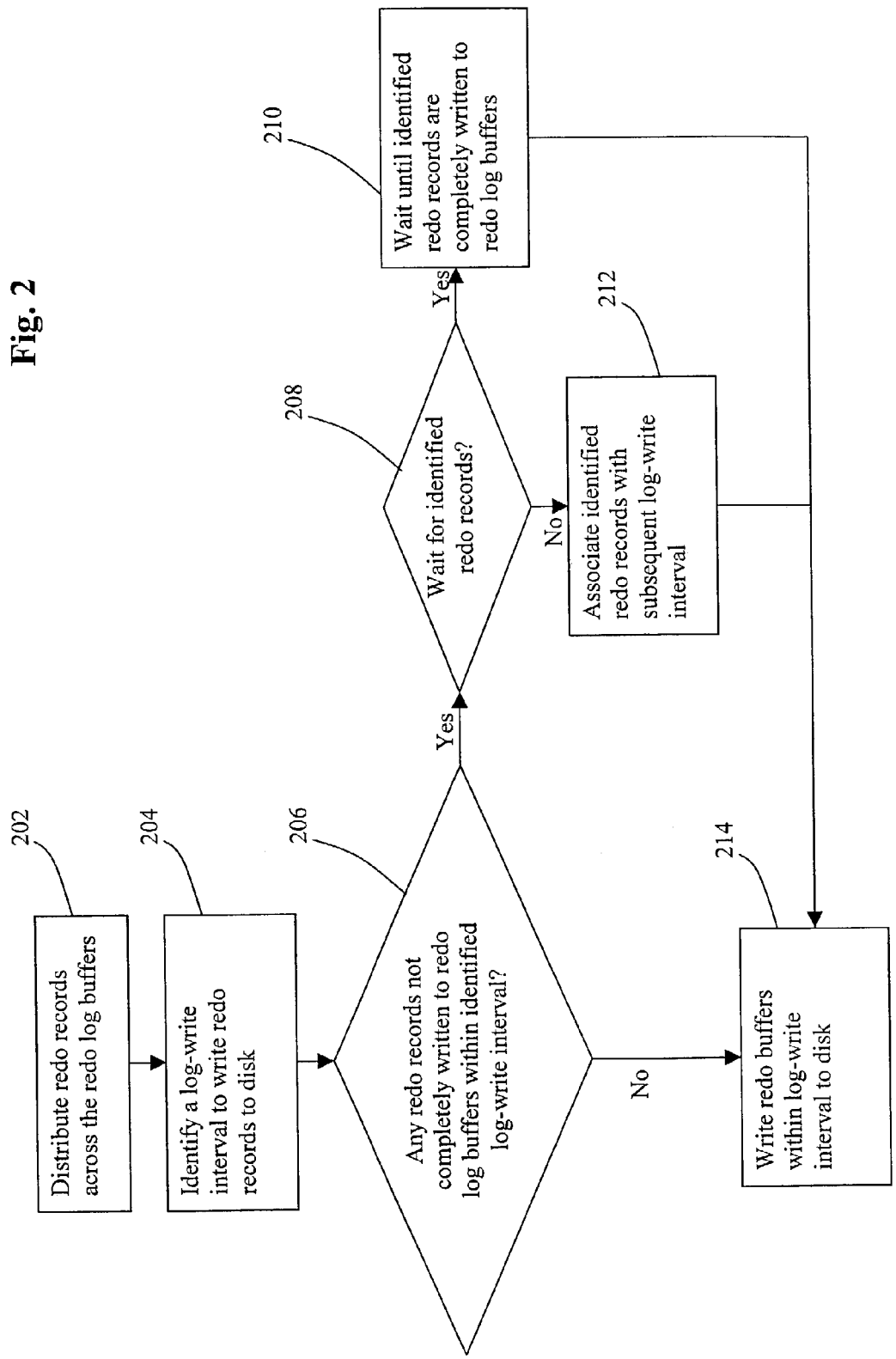
FIG. 2 shows a flowchart of a process for implementing redo records according to an embodiment of the invention.

FIG. 2 shows a flowchart of a process for implementing and generating redo records according an embodiment of the invention. At 202, redo records are generated and distributed across the in-memory redo buffers in memory. As can be appreciated by one skilled in the art, any appropriate distribution algorithm can be used to distribute the redo records generated in a database across multiple red log buffers. For example, one approach is to distribute the redo records to perform load balancing across the available in-memory redo buffers.

At 204, a log-write interval is identified for the next set(s) of redo records to write to disk. As noted above with respect to the discussion of the log-writer entity 152, numerous suitable approaches may be used to determine the extent and timing of the log-write intervals. After the boundaries of the log-write interval have been selected, it is published and made visible to any interested entities in the database system. In one approach, this publication occurs by creating a visible system "beacon" that identifies the end-point or end time period of the log-write interval to be written to disk.

After the beacon has been published, any execution entity that is presently processing work in the system can access the beacon to determine whether its associated redo record will have a timestamp that falls within the boundary of the log-write interval. In addition, the log-writer can be configured to track pending operations to determine whether a pending redo record/operation will have a timestamp that causes it to fall within the boundaries of the log-write interval.

One reason for publishing the beacon is to ensure that all redo records within the specified time period for the log-write interval are collectively written to disk. For the redo records to satisfy accepted database consistency requirements, all redo records from within the specified time period should be present in the correct interval within the on-disk redo log. Otherwise, if any gaps exist in the redo records, then applying the redo records could restore an inconsistent and erroneous state for the database. As noted above, in a present embodiment, no specific ordering requirements are enforced when writing the redo records for the multiple in-memory redo buffer to disk. Therefore, no sorting is performed up-front to make sure that gaps do not exist in the interval of redo records that are written to disk for a log-write interval.

To ensure that no such gaps exist in the range of redo records written to disk, the beacon is checked to determine whether any pending operations in the database will be completed and result in a redo record that is written after the end-point of the log-write interval (206). If so, then a determination is made whether the log-write process should wait for the completion of the identified pending operation (s) before writing the collective redo records for the log-write interval out to disk (208). One example criteria that can be used to make this determination is whether the pending operation has already begun processing, or whether it is merely queued for processing. In one embodiment, if the pending operation has already begun processing and/or generating redo records before the beacon, but will not complete until after the end-point of the log-write interval, then the log write process waits for the pending operation to finish before writing the collective redo records for the log-write interval to disk (210). On the other hand, if the pending operation has not yet begun processing and begins generating redo after the new beacon is published, and it is possible to delay its execution, then it is delayed until the subsequent log-write interval, and will not be associated with the present log-write interval (212).

To facilitate identification of redo records that fall within the log-write interval, the log-writer can be configured to look for and recognize the range of active threads in the database. If a particular thread has completed its processing, then an indication can be made that its redo record is ready to be written to disk. Once all appropriate redo records for the log-write interval are ready, they are written as a group to the on-disk redo log (214).

The on-disk redo log is structured such that ready identification can be made of the group of redo records that is associated with a specific log-write interval range. In one embodiment, an information item or structure, herein referred to as a "log-write header", "range marker" or "range separator", is placed at the beginning of each interval of redo records written to disk. The log-write header delineates each group of redo records associated with different log-write intervals. A "redo strand" is a collection of redo records from an in-memory redo buffer. Within a group of redo records for a given log-write interval, a redo strand header is used to separate the redo records from the different log buffers.

Figure 3:
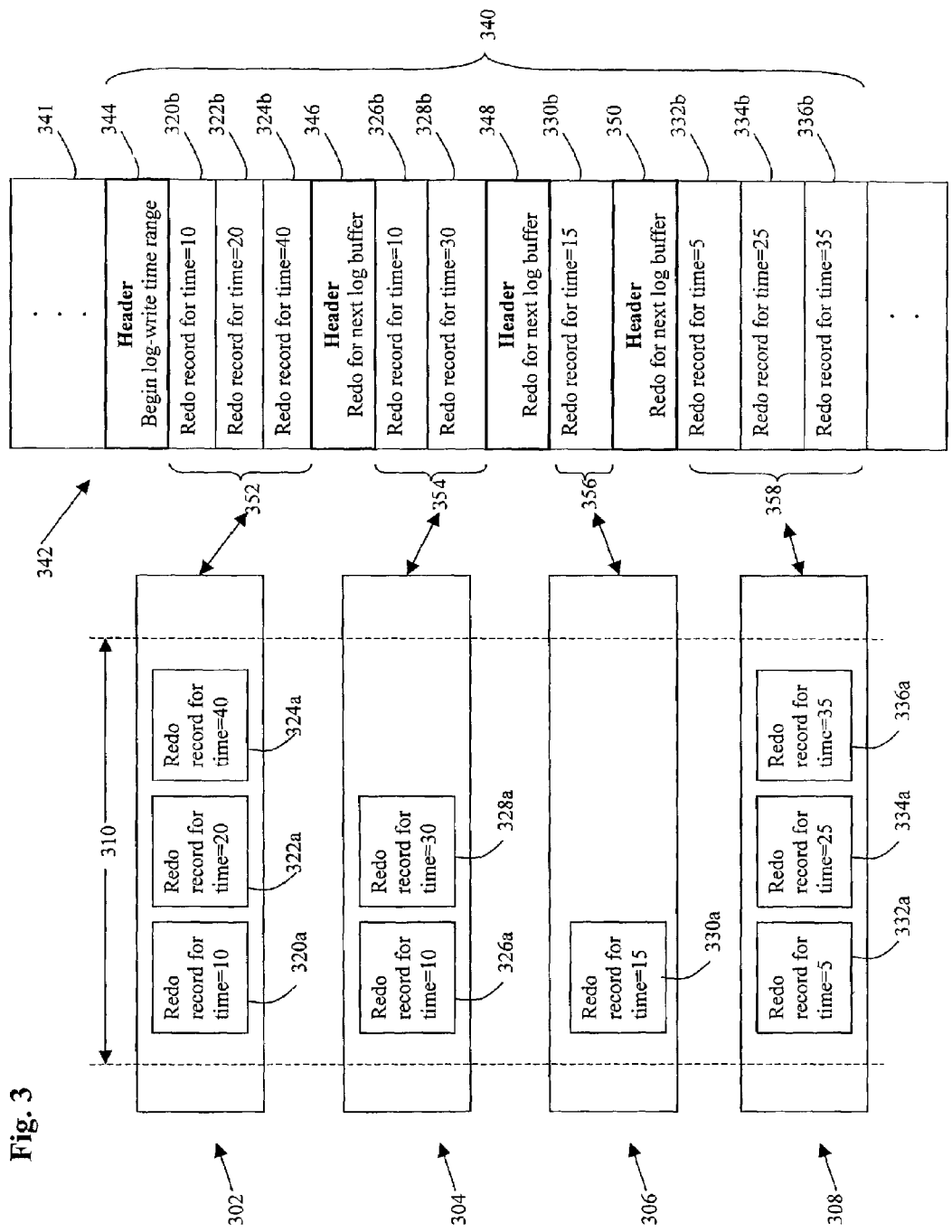
FIG. 3 depicts an example format for a on-disk redo log according to an embodiment of the invention.

FIG. 3 shows an example format for a on-disk redo log 342 according to an embodiment of the invention. On-disk redo log 342 is populated with redo records from in-memory redo buffers 302, 304, 306, and 308. A given log-write interval 310 corresponds to a set 340 of redo records in on-disk redo log 342. Consider if log-write interval 310 encompasses redo records 320a, 322a, and 324a from in-memory redo buffer 302, redo records 326a and 328a from in-memory redo buffer 304, redo record 330a from in-memory redo buffer 306, and redo records 332a, 334a, and 336a from in-memory redo buffer 308.

It is noted that within each in-memory redo buffer, the redo records can be ordered based upon their relative timestamp values. Thus, in in-memory redo buffer 302, redo record 320a appears first since it has the earliest relative timestamp (timestamp=10), followed by redo record 322a which has the next earliest timestamp (timestamp=20), which is followed by redo record 324a which has the latest timestamp (timestamp=40) within the present log-write interval 310 for in-memory redo buffer 302. Similarly, the redo records in in-memory redo buffer 304 are ordered with redo record 326a appearing first since it has an earlier timestamp value (timestamp=10) than redo record 328a (timestamp=30). Likewise, in in-memory redo buffer 308, redo record 332a appears first since it has the earliest relative timestamp (timestamp=5), followed by redo record 334a which has the next earliest timestamp (timestamp=25), which is followed by redo record 336a (timestamp=35).

When the log write occurs, a log-write header 344 is inserted into the on-disk redo log 342 to indicate that a new set 340 of redo records for a log-write interval 310 is being written to disk. This log-write header 344 delineates the present set 340 from the immediately preceding interval 341 of redo records for a prior log write operation.

When the group of redo strands from in-memory redo buffers 302, 304, 306, and 308 are written to on-disk redo log 342, the order in which the separate strands of redo records are written to disk may not be specified up-front in the present embodiment. However, the ordering of the redo records within each redo strand can be maintained to create a partially ordered group of redo records within set 340. As each redo strand is written to disk, a redo strand header is inserted to delineate each ordered set of redo records. For example, if the redo strand 352 of redo records 320a, 322a, 324a from in-memory redo buffer 302 is written first and the redo strand 354 of redo records 326a, 328a from in-memory redo buffer 304 is written second, then a redo strand header 346 is inserted in on-disk redo log 342 to separate the two redo strands 352, 354 of redo records. Similarly, if the redo strand 356 of redo records 330a from in-memory redo buffer 306 is next written to disk, then a redo strand header 348 is inserted to separate the two redo strands 354, 356 of redo records. Finally, when the redo strand 358 of redo records 332a, 334a, 336a is written to disk, a redo strand header 350 is inserted to separate the two redo strands 356, 358 of redo records. As described in more detail below, these redo strand headers identify the different ordered redo strands of redo records, which facilitates merging of records if required during recovery.

Figure 4:
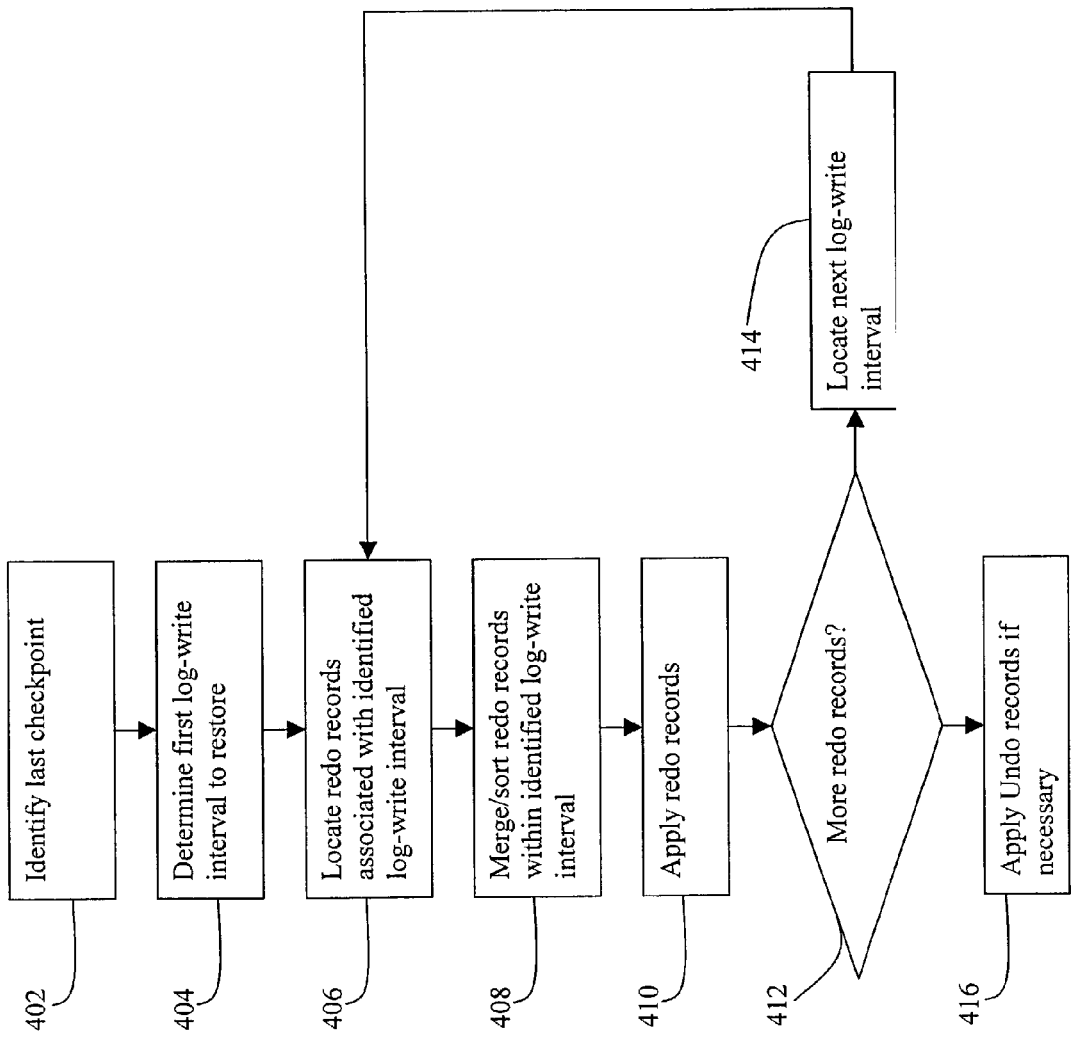
FIG. 4 shows a flowchart of a process for performing recovery and ordering redo records according to an embodiment of the invention.

FIG. 4 shows a flowchart of a process for performing recovery and resolving log file ordering during recovery according to an embodiment of the invention. In this embodiment of the invention, recovery is performed one log-write interval at a time, with the redo records from the on-disk redo log for each successive log-write interval applied in order. If the redo records for the log-write intervals are partially ordered (e.g., as shown in FIG. 3), then a merge procedure can be performed to order the redo records. If the redo records for the log-write intervals are not partially ordered, then a sorting procedure is performed.

At 402, the last checkpoint is identified for the database system. The last checkpoint identifies the last point in time in which the changes made to the database in memory has been persistently stored to disk. The last checkpoint, therefore, identifies the point from which recovery is initiated in the event of a system failure.

Based upon the last checkpoint value, the first log-write interval of redo records that should be applied to restore the system can be identified (404). In one embodiment, checkpointing in the system can be synchronized with the log-write intervals such that the time of a checkpoint coincides with the boundary of a log-write interval. If this is the case, then the beginning set of redo records to apply after a failure would be redo records corresponding to the next subsequent log-write interval after the latest checkpoint. If the time of the latest checkpoint is not synchronized to the boundaries of the log-write intervals, then the redo records to apply after a failure corresponds to the log-write interval associated with the first of any changes to the database that was not persistently stored to disk in the latest checkpoint. Any redo records in that log-write interval can be discarded if their associated changes are already reflected in the restored database.

Based upon the log-write interval of redo records to apply, the specific offset within the on-disk redo log is identified for that interval of redo records (406). In one embodiment, this is identified by locating the log-write header in the on-disk redo log associated with the specified log-write time interval.

To properly apply the redo records, they are arranged to create a sequentially-ordered group of redo records. The redo records are sequentially ordered to ensure that changes are applied to the database in the order in which they were generated, so that a consistent and correct version of the database can be restored. Within the range of redo records to apply, there may be ordered subsets of redo records from multiple in-memory redo buffers. If the redo records are already ordered within a redo strand, then a sorting procedure is not required. Instead, a merge operation can be performed to create proper ordering across all the redo strands in the log-write interval (408). To perform the merge operation, the separate sets of ordered redo records are identified based upon the redo strand headers that separates the sets. Once the separate sets have been identified, then the sets of ordered redo records are merged together until an ordered group of redo records have been established for the entire range of records for the relevant log-write interval. If the redo records are not already ordered within each set, then a sorting procedure is performed instead of, or in addition to, a merge between the different sets of redo records.

Once the redo records have been properly ordered, e.g., merged and/or sorted, they are applied to the database to restore the system to a state as of the time corresponding to the end-point of the log-write interval associated with the redo records (410). Once all the redo records for the log-write interval have been applied, a determination is made whether any further redo records exist in the on-disk redo log to be applied (412). If so, then the next log-write interval of redo records is identified (414) and the process repeated for the next range of redo records. Once all the redo records have been applied, then undo records can be applied to roll back any uncommitted changes to the database that has been restored by application of the redo records (416).

While the present embodiment has described the use of the partially ordered records for database recovery, it should be clear that the invention is generally applicable to any other processing that requires an ordered list of records.

It is noted that for database consistency, since each log-write interval of redo records should be a complete collection of all redo records corresponding to the time periods associated with that log-write interval for the records, any missing redo records for that time interval may render the entire group of redo records invalid. Since the last group of redo records written to disk may be incomplete, e.g., because the failure occurs during the log write process, then in one embodiment, the entire group of redo records for the incomplete interval is discarded rather than applied during a restore procedure. In an alternative approach, if it can be determined where gaps exist in the redo records, then the redo records can be applied up to the identified gap in the redo records during the restore. For example, if it can be determined that the only redo records that are missing comprise the last redo records in the range, then all of the prior redo records in the range can be applied without resulting in database inconsistencies or errors.

Figure 5:
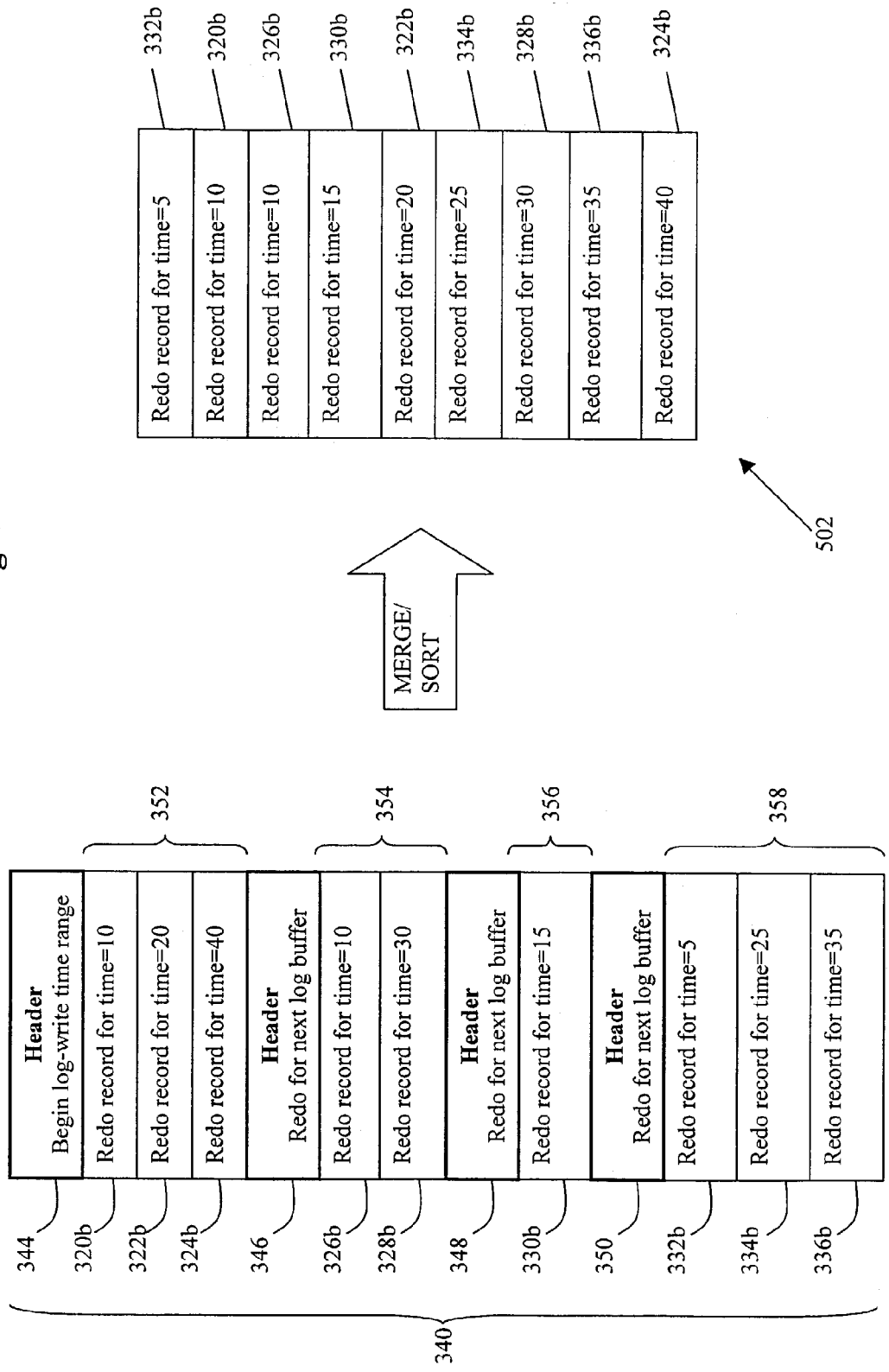
FIG. 5 illustrates a process for merging and ordering redo records according to an embodiment of the invention.

FIG. 5 illustrates an example of a process for resolving on-disk redo log ordering during recovery. Shown is the set 340 of redo records taken from the log-write interval example of FIG. 3. As previously noted, the redo records for this log-write interval is partially ordered since the redo records associated with each different in-memory redo buffer is internally sorted, even though the entire collection of redo records is not sorted. Thus, redo records 320b, 322b, and 324b comprise an ordered subset of redo records within set 340. Similarly, redo records 326b and 328b comprise ordered subset 354, redo record 330b comprise ordered subset 356, and redo records 332b, 334b, and 336b comprise ordered subset 358.

Since set 340 is partially ordered with multiple ordered subsets 352, 354, 356, 358 of redo records, an ordering operation is not required in this example to create a single group of sequentially-ordered redo records. Instead, a merge operation can be performed in this example to properly order all the redo records in set 340. Here, the ordered subset 352, 354, 356, 358 of redo records are separated by redo strand headers 346, 348, and 350. The redo strand headers, therefore, identify the delineation points between the subsets of redo records that are to be merged together.

After the merge operation, a single group 502 of sequentially-ordered redo records will exist corresponding to set 340. Since the redo records for range 340 are now ordered, this group 502 of redo records can be applied without causing consistency errors in the database.

It is noted that ordering operations can also be performed, instead of or in addition to the described merge operation. One example of where an ordering operation could be performed is in the situation in which the set 340 is not already partially ordered, e.g., when the redo generation process is not configured to ensure that it includes subsets of redo records from the different in-memory redo buffers which are ordered.

The present description has been illustrated with reference to generating and using log records in a database system. It is noted, however, that the present invention can be applied to implement any ordered records or objects, e.g., any log file that needs to be time ordered when consumed. For example, the present invention can be applied to synchronize remote storage devices by transferring logs of changed tracks. Therefore, the present invention is not to be limited to database log records, and indeed, is equally applicable to other systems in which a log record is generated and later used for further processing. The set of records can be generated in a different ordering than the ordering later used for processing. More relaxed ordering may be permitted up-front to increase concurrency and the efficiency of records generation, while later performing ordering or sorting actions to create a more-sorted set of records.

System Architecture Overview

Figure 6:
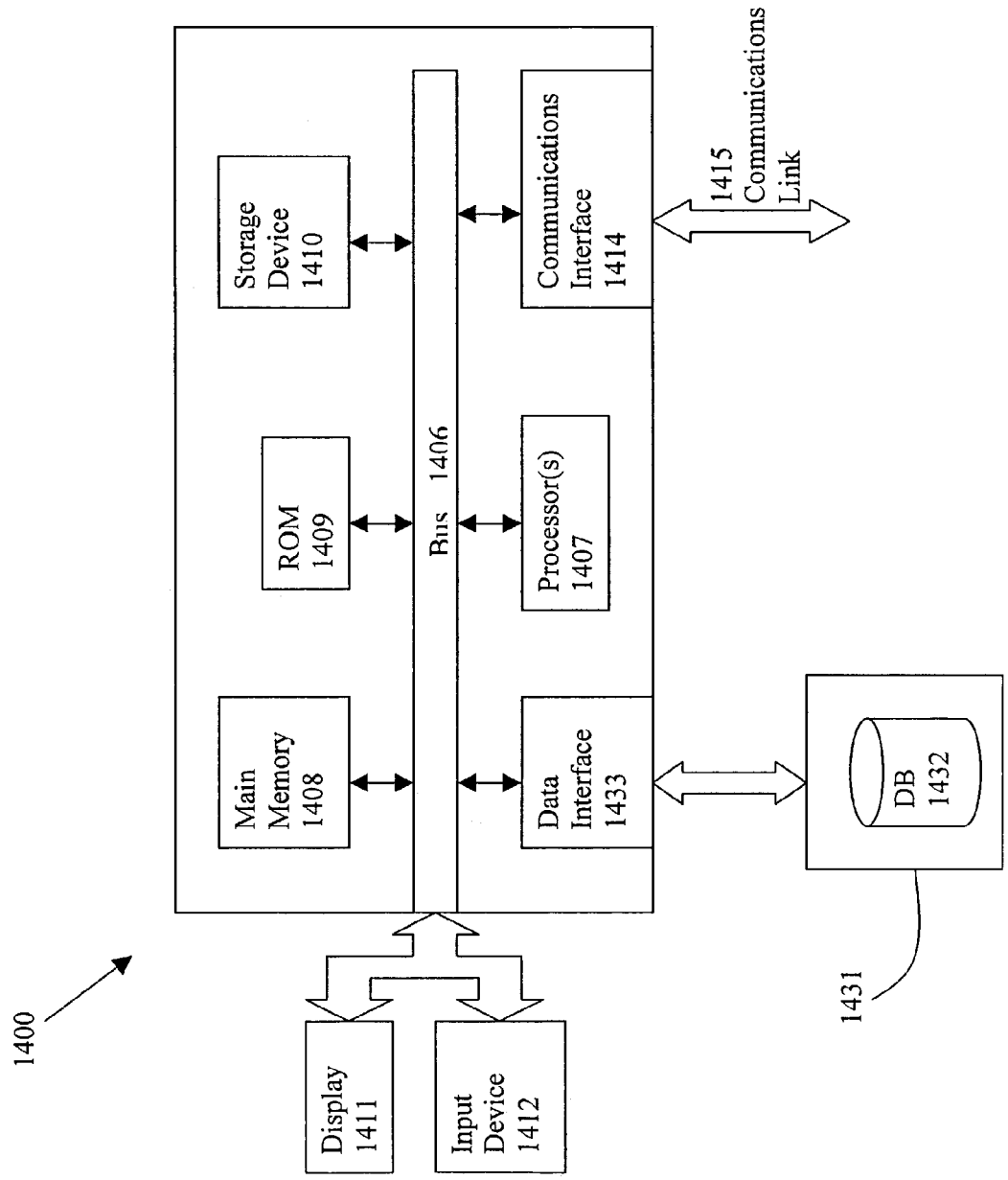
FIG. 6 is a diagram of a computer system with which the present invention can be implemented.

The execution of the sequences of instructions required to practice the invention may be performed in embodiments of the invention by a computer system 1400 as shown in FIG. 6. As used herein, the term computer system 1400 is broadly used to describe any computing device that can store and independently run one or more programs. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

Each computer system 1400 may include a communication interface 1414 coupled to the bus 1406. The communication interface 1414 provides two-way communication between computer systems 1400. The communication interface 1414 of a respective computer system 1400 transmits and receives signals, e.g., electrical, electromagnetic or optical signals, that include data streams representing various types of information, e.g., instructions, messages and data. A communication link 1415 links one computer system 1400 with another computer system 1400. A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives signals, e.g., electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407. The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407. A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium" or "computer-readable medium" as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for implementing records in a computing system, comprising:
    establishing two or more in-memory buffers;
    distributing records across the two or more in-memory buffers;
    identifying a cross-sectional interval for the two or more in-memory buffers, the cross-sectional interval based upon a temporal period, the cross-section intervals corresponding to a subset of zero or more records for each of the two or more in-memory buffers, the subset of zero or more records for each of the two or more in-memory buffers being temporally ordered; and
    writing the subset of zero or more records for each of the two or more in-memory buffers to the persistent storage medium, wherein records written to the persistent storage medium are not sequentially ordered as an entire group.

2. The method of claim 1 in which the records written to the persistent storage medium are later processed.

3. The method of claim 2 wherein the records written to the persistent storage medium are converted into sequentially ordered records during the later processing.

4. The method of claim 2 wherein database recovery is performed during the later processing.

5. The method of claim 1 in which the two or more log buffers comprise two or more in-memory redo buffers and the records comprise redo records.

6. The method of claim 1 in which the records distributed across the two or more in-memory buffers are ordered within each in-memory buffer.

7. The method of claim 1 in which the records written to the persistent storage medium are partially ordered.

8. The method of claim 7 in which sequentially-ordered records are generated by merging the partially ordered records written to the persistent storage medium.

9. The method of claim 1 in which the records written to the persistent storage medium do not have pre-allocated locations for individual records.

10. The method of claim 1 in which a system checkpoint is synchronized to the temporal period of the cross-sectional interval.

11. The method of claim 10 in which later processing against the records written to the persistent storage medium is performed against a cross-sectional interval following the system checkpoint.

12. The method of claim 11 in which database recovery is performed during the later processing.

13. The method of claim 1 in which the records are distributed across the two or more in-memory buffers to balance load across the two or more in-memory buffers.

14. The method of claim 1 in which the records comprise log information describing changes for remote storage devices.

15. A method for implementing records in a computing system, comprising:
    establishing multiple buffers in the computing system;
    distributing records across the multiple buffers;
    identifying an interval within the multiple buffers to write the records to a persistent storage medium; and
    writing the records to the persistent storage medium, wherein the records written to the persistent storage medium are not sequentially ordered as an entire group.

16. The method of claim 15 in which the computing system comprises a database system, wherein the records comprise redo records, the multiple buffers comprise multiple redo buffers, and the interval comprises a log-write interval.

17. The method of claim 15 in which the records written to the persistent storage medium comprises partial ordering, the partial ordering comprising an ordering for each subset of records corresponding to the interval of each of the multiple buffers.

18. The method of claim 15 in which the interval is temporally based.

19. The method of claim 18 in which a record corresponds to the interval if the record is associated with a timestamp that falls within the boundaries of the interval.

20. The method of claim 15 in which the records written to the persistent storage medium do not have pre-allocated locations for individual records.

21. The method of claim 15 in which a system checkpoint is synchronized against the boundaries of the interval.

22. The method of claim 15 further comprising:
establishing a boundary of the interval; and
determining if a pending operation will result in an individual record beyond the boundary of the interval.

23. The method of claim 22 in which the boundary of the interval is published as a visible beacon.

24. The method of claim 22 in which the interval is delayed for completion of the pending operation.

25. The method of claim 22 in which the pending operation is synchronized to a later interval.

26. The method of claim 15 in which the records written to the persistent storage medium are later processed.

27. The method of claim 26 wherein the records written to the persistent storage medium are converted into sequentially ordered records during the later processing.

28. The method of claim 26 wherein database recovery is performed during the later processing.

29. A method for applying ordered records, in which one or more intervals of records have been persistently stored to a persistent storage medium, each of the one or more intervals of records comprising a self-contained set of records for a given interval, comprising:
(a) identifying a checkpoint;
(b) identifying an interval of records corresponding to the checkpoint;
(c) creating an ordered group of records by ordering records within the interval of records;
(d) applying the ordered group of records;
(e) determining whether an additional interval of records are to be applied; and
(f) repeating (c) through (e) until no further intervals of records are to be applied.

30. The method of claim 29 in which the ordered records are applied to a database system, wherein the records comprise redo records.

31. The method of claim 29 in which (c) comprises merging or sorting the records within the first interval of records.

32. The method of claim 29 in which the checkpoint is synchronized to a boundary of the one or more intervals of records.

33. The method of claim 29 in which the checkpoint is not synchronized to a boundary of the one or more intervals of records, and wherein any records corresponding to changes already within the database at the checkpoint are discarded.

34. The method of claim 29 in which the interval of records and the additional interval of records are applied in order.

35. The method of claim 29 in which a determination is made whether the ordered group of records is missing any individual records.

36. The method of claim 35 in which the ordered group is discarded without being applied.

37. The method of claim 35 in which a determination is made whether the missing individual records will cause an error, and the ordered group is applied if no error will result.

38. A structure in a computing system for implementing records on a persistent storage medium, comprising an on-disk log comprising two or more intervals of records, each of the two or more intervals of records comprising a self-contained set of records for a given interval, wherein each of the two or more intervals of records comprises a collection of unordered records.

39. The structure of claim 38 in which a log-write header separates each of the two or more intervals of records.

40. The structure of claim 38 in which each of the two or more intervals of records comprises a partially ordered collection of ordered subsets of records.

41. The structure of claim 40 in which a strand header separates each ordered subset of records.

42. The structure of claim 40 in which each ordered subset of records corresponds to a specific log in memory.

43. The structure of claim 38 in which the computing system comprises a database system, wherein the records comprise redo records and the on-disk log comprises an on-disk redo log.

44. A computer program product comprising a tangible computer usable medium having executable code to execute a process for implementing records in a computing system, the process comprising the steps of:
establishing two or more in-memory buffers;
distributing records across the two or more in-memory buffers;
identifying a cross-sectional interval for the two or more in-memory buffers, the cross-sectional interval based upon a temporal period, the cross-section intervals corresponding to a subset of zero or more records for each of the two or more in-memory buffers, the subset of zero or more records for each of the two or more in-memory buffers being temporally ordered; and
writing the subset of zero or more records for each of the two or more in-memory buffers to the persistent storage medium, wherein records written to the persistent storage medium are not sequentially ordered as an entire group.

45. A system for implementing records in a computing system, comprising:
means for establishing two or more in-memory buffers;
means for distributing records across the two or more in-memory buffers;
means for identifying a cross-sectional interval for the two or more in-memory buffers, the cross-sectional interval based upon a temporal period, the cross-section intervals corresponding to a subset of zero or more records for each of the two or more in-memory buffers, the subset of zero or more records for each of the two or more in-memory buffers being temporally ordered; and
means for writing the subset of zero or more records for each of the two or more in-memory buffers to the persistent storage medium, wherein records written to the persistent storage medium are not sequentially ordered as an entire group.

46. A computer program product comprising a tangible computer usable medium having executable code to execute a process for implementing records in a computing system, the process comprising the steps of:
establishing multiple buffers in the computing system;
distributing records across the multiple buffers;
identifying an interval within the multiple buffers to write the records to a persistent storage medium; and writing the records to the persistent storage medium, wherein the records written to the persistent storage medium are not ordered as an entire group.

47. A system for implementing records in a computing system, comprising:
- means for establishing multiple buffers in the computing system;
- means for distributing records across the multiple buffers;
- means for identifying an interval within the multiple buffers to write the records to a persistent storage medium; and
- means for writing the records to the persistent storage medium, wherein records written to the persistent storage medium are not sequentially ordered as an entire group.

48. A computer program product comprising a tangible computer usable medium having executable code to execute a process for applying ordered records in a computing system, in which one or more intervals of records have been persistently stored to a persistent storage medium, each of the one or more intervals of records comprising a self-contained set of records for a given interval, the process comprising:
- (a) identifying a checkpoint;
- (b) identifying an interval of records corresponding to the checkpoint;
- (c) creating an ordered group of records by ordering records within the interval of records;
- (d) applying the ordered group of records;
- (e) determining whether an additional interval of records are to be applied; and
- (f) repeating (c) through (e) until no further intervals of records are to be applied.

49. A system for applying ordered records in a computing system, in which one or more intervals of records have been persistently stored to a persistent storage medium, each of the one or more intervals of records comprising a self-contained set of records for a given interval, comprising:
- (a) means for identifying a checkpoint;
- (b) means for identifying an interval of records corresponding to the checkpoint;
- (c) means for creating an ordered group of records by ordering records within the interval of records;
- (d) means for applying the ordered group of records;
- (e) means for determining whether an additional interval of records are to be applied; and
- (f) means for utilizing (c) through (e) until no further intervals of records are to be applied.

50. A method for implementing redo records in a database, comprising:
- establishing multiple redo buffers in a database system;
- distributing redo records across the multiple redo buffers;
- identifying a log-write interval within the multiple redo buffers to write the redo records to a persistent storage medium; and
- writing the redo records to the persistent storage medium, wherein the redo records written to the persistent storage medium are not ordered as an entire group.

51. The method of claim 50 in which the redo records written to the persistent storage medium comprises partial ordering, the partial ordering comprising an ordering for each subset of redo records corresponding to the log-write interval of each of the multiple redo buffers.

52. The method of claim 50 in which the redo records written to the persistent storage medium do not have pre-allocated locations for individual redo records.

53. The method of claim 50 in which a system checkpoint is synchronized against the boundaries of the log-write interval.

54. The method of claim 50 further comprising:
- establishing a boundary of the log-write interval; and
- determining if a pending operation will result in an individual redo record beyond the boundary of the log-write interval.

55. The method of claim 54 in which the boundary of the log-write interval is published as a visible beacon.

56. The method of claim 54 in which the log-write interval is delayed for completion of the pending operation.

57. The method of claim 54 in which the pending operation is synchronized to a later log-write interval.

58. The method of claim 50 in which the records written to the persistent storage medium are later processed.

59. The method of claim 58 wherein the records written to the persistent storage medium are converted into sequentially ordered records during the later processing.

60. The method of claim 58 wherein database recovery is performed during the later processing.

* * * * *